United States Patent
Desjeux (10) Patent No.: US 7,325,723 B2
(45) Date of Patent: Feb. 5, 2008

(54) SYSTEM AND METHOD FOR DETECTING PERSONS OR OBJECTS IN DEFINITE AREAS PROVIDED EACH WITH AT LEAST AN ENTRANCE

(75) Inventor: Olivier Desjeux, Neuchatel (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 10/552,070

(22) PCT Filed: May 14, 2002

(86) PCT No.: PCT/EP02/05328

§ 371 (c)(1),
(2), (4) Date: Oct. 4, 2005

(87) PCT Pub. No.: WO03/003290

PCT Pub. Date: Jan. 9, 2003

(65) Prior Publication Data
US 2006/0157562 A1 Jul. 20, 2006

(30) Foreign Application Priority Data
May 14, 2001 (EP) .................................. 01201768

(51) Int. Cl.
*G08B 13/14* (2006.01)
*H04Q 5/22* (2006.01)
*G06K 5/00* (2006.01)
*G06K 19/00* (2006.01)

(52) U.S. Cl. ................... 235/380; 235/487; 340/572.1; 340/10.3

(58) Field of Classification Search ................ 235/487, 235/380; 340/10.3, 572
See application file for complete search history.

(56) References Cited

U.S. PATENT DOCUMENTS

| 4,249,167 A | * | 2/1981 | Purinton et al. | ......... 340/572.2 |
| 4,303,910 A | * | 12/1981 | McCann | .................. 340/572.2 |
| 5,245,346 A | * | 9/1993 | Nishimura et al. | ........... 342/42 |

(Continued)

FOREIGN PATENT DOCUMENTS

FR          2 664 075          1/1992

(Continued)

*Primary Examiner*—Daniel Walsh
(74) *Attorney, Agent, or Firm*—Sughrue Mion, PLLC (57) ABSTRACT

A system and a method are described for detection of individuals (8) or objects in a plurality of delimited spaces (10), each having at least one entrance (6). The detection system comprises LF transmission means (4, 4*, 5, 5*) located at the entrance, for transmitting a LF electromagnetic signal, HF transmission-reception means (12, 13) for transmitting-receiving a HF electromagnetic signal (C, ACK), cards or portable electronic units (36) equipping each individual or object, for receiving the LF signal and for transmitting and receiving the HF signal, and a central processing unit (20) for recording data relating to the entry and exit of the portable electronic units. The system can operate according to at least two distinct modes of operation and the LF signal comprises selection information (SELECT) indicating which of the two modes of operation should be used by the electronic units during their passage through the entrance. The system is preferably configured to pass, at least temporarily, in one of the said delimited spaces, from one mode of operation to the other.

9 Claims, 5 Drawing Sheets

U.S. PATENT DOCUMENTS

| | | | | |
|---|---|---|---|---|
| 5,317,309 | A * | 5/1994 | Vercellotti et al. | 340/10.5 |
| 5,708,423 | A * | 1/1998 | Ghaffari et al. | 340/5.8 |
| 5,793,290 | A * | 8/1998 | Eagleson et al. | 340/573.4 |
| 6,107,910 | A * | 8/2000 | Nysen | 340/10.1 |
| 6,371,379 | B1 * | 4/2002 | Dames et al. | 235/493 |
| 6,415,978 | B1 * | 7/2002 | McAllister | 235/462.01 |
| 6,588,661 | B2 * | 7/2003 | Degrauwe et al. | 235/382 |
| 6,714,119 | B1 * | 3/2004 | Mindl et al. | 340/5.72 |
| 6,882,268 | B2 * | 4/2005 | Roz et al. | 340/5.72 |
| 6,924,773 | B1 * | 8/2005 | Paratte | 343/728 |
| 7,026,924 | B2 * | 4/2006 | Degrauwe et al. | 340/523 |
| 7,075,436 | B2 * | 7/2006 | Shanks et al. | 340/572.1 |
| 2001/0045465 | A1 * | 11/2001 | Schmidt et al. | 235/462.45 |
| 2002/0084889 | A1 * | 7/2002 | Bolavage et al. | 340/10.1 |
| 2002/0134833 | A1 * | 9/2002 | Degrauwe et al. | 235/382 |
| 2003/0030568 | A1 * | 2/2003 | Lastinger et al. | 340/825.49 |
| 2003/0092448 | A1 * | 5/2003 | Forstrom et al. | 455/456 |
| 2004/0070501 | A1 * | 4/2004 | Degrauwe et al. | 340/572.1 |
| 2004/0150510 | A1 * | 8/2004 | Taki et al. | 340/10.1 |
| 2004/0178882 | A1 * | 9/2004 | Roz et al. | 340/5.72 |
| 2004/0183657 | A1 * | 9/2004 | Chang | 340/426.13 |
| 2005/0083174 | A1 * | 4/2005 | Nakamura et al. | 340/5.72 |
| 2005/0237163 | A1 * | 10/2005 | Lee et al. | 340/10.51 |
| 2005/0237220 | A1 * | 10/2005 | Nolan et al. | 340/825.69 |
| 2005/0253686 | A1 * | 11/2005 | Shafer et al. | 340/10.1 |
| 2005/0258966 | A1 * | 11/2005 | Quan | 340/572.7 |
| 2005/0280535 | A1 * | 12/2005 | Gary, Jr. | 340/572.1 |
| 2006/0022800 | A1 * | 2/2006 | Krishna et al. | 340/10.2 |
| 2006/0066444 | A1 * | 3/2006 | Steeves | 340/10.5 |
| 2006/0085297 | A1 * | 4/2006 | Minerley | 705/28 |
| 2006/0132312 | A1 * | 6/2006 | Tavormina | 340/572.7 |
| 2007/0030150 | A1 * | 2/2007 | Mullins | 340/572.1 |
| 2007/0052540 | A1 * | 3/2007 | Hall et al. | 340/572.1 |
| 2007/0066278 | A1 * | 3/2007 | Hong | 455/405 |

FOREIGN PATENT DOCUMENTS

| | | |
|---|---|---|
| WO | WO 92 08148 | 5/1992 |
| WO | WO 00 67208 | 11/2000 |
| WO | WO 01 03057 | 1/2001 |

* cited by examiner

SYSTEM AND METHOD FOR DETECTING PERSONS OR OBJECTS IN DEFINITE AREAS PROVIDED EACH WITH AT LEAST AN ENTRANCE

BACKGROUND OF THE INVENTION

This invention relates to the detection of individuals or objects in delimited spaces each having at least one entrance. By entrance is to be understood in broad terms any door or way through giving access to the delimited space in question. By way of example detection of the presence of individuals during a journey on public transport or during a sports or cultural event taking place in a delimited place is envisaged.

Within the scope of the present invention detection of the presence of individuals or objects is envisaged by means of cards or portable electronic units having means for receiving and transmitting data in the form of electromagnetic signals. It is envisaged that the individuals or objects will be equipped with such portable electronic units.

International application WO 01/03057, incorporated herein by reference, also in the name of the present Applicant, describes one such method of detection, as well as a detection system for individuals or objects in a delimited space having an entrance.

Figure 1:
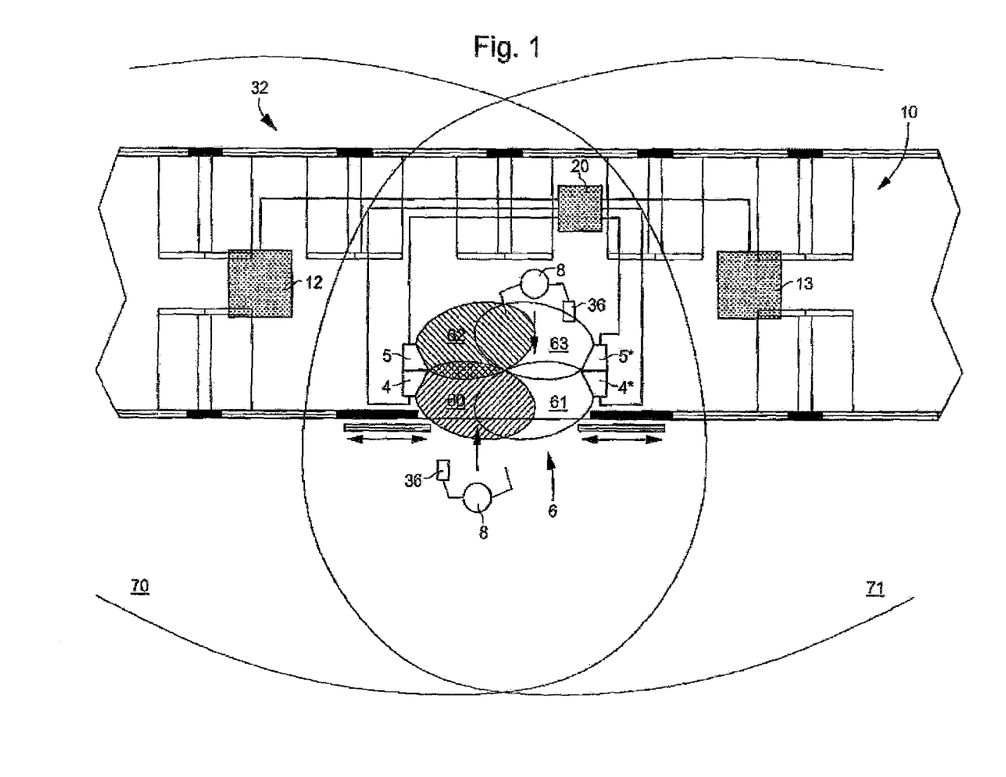
FIG. 1, already introduced, is a schematic illustration of a detection system for individuals or objects.

One embodiment of the detection system described in this document is represented in FIG. 1. It is proposed to equip each delimited space, indicated by the reference numeral 10, (for example defined by the compartment 32 of a subway train, a railway carriage, a bus, etc.) with low frequency transmission means 4, 4*, 5, 5* located at the entrance 6 (at each entrance as the case may be). These transmission means are arranged to transmit low frequency electromagnetic signals carrying data to the portable electronic unit (indicated by the reference numeral 36) with which the individual 8 or object is equipped, during the passage of an individual (denoted by the reference numeral 8) or of an object through the entrance 6.

The low frequency transmission means 4, 4*, 5, 5* are arranged to transmit at a relatively low frequency (of the order of a hundred kHz) at least one first low frequency electromagnetic signal within a communication region (formed of communication regions 60, 61, 62 and 63 in the illustration of FIG. 1) essentially covering the entrance 6 to the delimited space 10.

The detection system further comprises high frequency transmission-reception means 12, 13 associated with the delimited space 10 and allowing bidirectional communication at a relatively high frequency (of the order of a hundred MHz or more) to be made with the portable electronic units 36. More precisely, these high frequency transmission-reception means 12, 13 comprise one or more high frequency receivers, here two in number, and one or more high frequency transmitters, also two in number in this example, located in the delimited space 10 in such a manner that the communication regions denoted by the reference numerals 70 and 71 defined by these transmitter-receivers 12, 13 substantially cover the whole area of the delimited space 10 comprising the entrance 6. These communication regions 70, 71 are in particular arranged to encompass the communication regions 61, 62, 63, 64 of the low frequency transmitters 4, 4*, 5, 5* located at the entrances.

Only one delimited space is illustrated in FIG. 1. Nevertheless it will be understood that all the delimited spaces, defined for example by the set of compartments of a subway train or the compartments of the transport means in question, are each equipped with like transmission and reception means.

Figure 2:
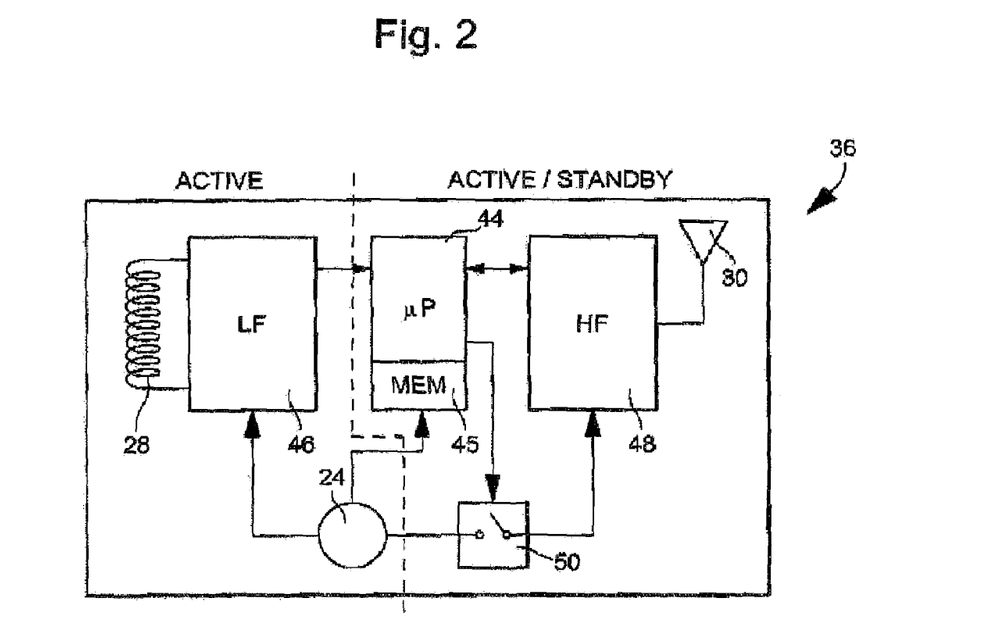
FIG. 2, already introduced, shows schematically one mode of implementation of a portable electronic unit of the system of FIG. 1.

FIG. 2 shows schematically the structure of one portable unit 36 of the detection system of FIG. 1. This portable electronic unit comprises a low frequency reception module 46 and an antenna 28 for receiving the data transmitted by means of the low frequency electromagnetic signal or signals emitted by the transmission means 4, 4*, 5, 5*, as well as a high frequency transmission-reception module 48 and an antenna 30 for exchanging data with the high frequency transmission-reception means 12, 13 associated with the delimited space 10 by means of a high frequency electromagnetic signal. In fact, as will be described in detail below, a high frequency electromagnetic signal (denoted by the reference C in the following description) is transmitted by the transmission-reception module 48 and a reception acknowledgement (denoted by the reference ACK in the following description) is transmitted by the transmission-reception means 12, 13 associated with the delimited space 10.

An electronic unit 44 for processing data, associated with a memory 45, is connected to the low frequency reception module 46 and the high frequency transmission-reception module 48. The electronic unit 36 is supplied by a power supply source 24 such as a cell or other battery. The data processing unit 44 can preferably be put into a standby mode in order to save power. Likewise the high frequency transmission-reception module 48 is adapted to be deactivated or put into standby by the data processing unit 44, as shown schematically by the interrupter means 50. Accordingly, only the low frequency reception module 46 is permanently or quasi-permanently powered and this activates the data processing unit 44 when a low frequency electromagnetic signal emitted by the low frequency transmission means is received by the receiver module 46.

According to one general mode of operation described in the international application mentioned above, the electronic units 36 are normally in standby mode. In standby mode the data processing unit 44 and the high frequency transmission-reception module are thus deactivated. When an electronic unit 36 in standby mode passes through an entrance of the system, such as the entrance 6 of FIG. 1, this electronic unit 36 is activated by the low frequency electromagnetic field emitted by the transmission means 4, 4*, 5, 5* and receives, via the transmitted low frequency electromagnetic signal or signals, data relating to the delimited space in question (for example identification of the vehicle or of the place entered by the individual or object, the date and time, and as applicable, other parameters relating to the delimited space 10). This data is stored in the memory 45 of the portable electronic unit 36.

When the electronic unit 36 has been activated and has passed through the entrance 6, it starts to communicate at high frequency by means of its high frequency transmission-reception module 48 with the transmission-reception means 12, 13 associated with the delimited space. During this high frequency communication, an identification of the portable electronic unit 36 is in particular transmitted to the transmission-reception means 12, 13 of the delimited space 10 for registration by a controlling computer 20 associated with this delimited space 10 and connected to the low frequency transmission means 4, 4*, 5, 5* as well as to the high frequency transmission-reception means 12, 13. In response the transmission-reception means 12, 13 transmit a reception acknowledgement addressed to the portable electronic unit 36.

The controlling computer 20, or more generally the central processing unit, thus keeps up to date a register containing the information on entry and exit of each electronic unit which has entered into the delimited space 10. In like manner, each portable electronic unit 36 can keep up to date a register of the last entries into and exits from delimited spaces, in particular the time, the date and an identification of each delimited space concerned.

According to a specific mode of operation of the detection system described in the abovementioned international application, each portable electronic unit, once activated by the low frequency electromagnetic field, proceeds to transmit, at least once, a high frequency electromagnetic signal addressed to the high frequency transmitter-receivers 12, 13 pending a reception acknowledgement emanating from these transmission-reception means 12, 13. This high frequency electromagnetic signal, or signal of interrogation of presence, is typically transmitted in a periodic manner and, when the high frequency signal transmitted by the portable electronic unit is no longer received by the high frequency transmission-reception means for a predetermined period of time, it is accepted that this portable electronic unit is no longer present in the interior of the delimited space 10 and the portable electronic unit 36 is then switched to standby mode.

By way of simplification, this first mode of operation will be denoted in the following description by the acronym "BIBO" (Be In Be Out) signifying that the presence or absence of an electronic unit 36 in the delimited space is determined on the basis of a reception by the high frequency transmission-reception means 12, 13 associated with the space 10 of a high frequency electromagnetic signal coming from the portable electronic unit.

According to a specific variant of the detection system described in the abovementioned international application, the transmission means comprise first and second low frequency transmitters, denoted respectively by the reference numerals 4, 4* and 5, 5*, as illustrated specifically in FIG. 1. These first and second transmitters are arranged to transmit respective first and second low frequency electromagnetic signals (denoted by the references A and B respectively in the following description) in first 60, 61 and second 62, 63 communication regions respectively, spatially separated from one another and partially overlapping. These first 60, 61 and second 62, 63 communication regions essentially cover the entrance 6 to the delimited space and are respectively situated towards the exterior and towards the interior of the delimited space 10, such that, when an individual or object enters into the delimited space 10, it firstly encounters the first A and then the second low frequency electromagnetic signal B.

In the illustration of FIG. 1, the first and second transmitters each comprise a pair of transmitters 4 and 4* and 5 and 5* respectively located on one side and the other of the entrance 6. It will nevertheless be understood that these first and second transmitters could each comprise only a single transmitter or even more than two, what matters being that the communication regions defined by these low frequency transmitters cover the zone of passage of individuals or objects through the entrance 6 and allow definition of a succession of spatially separated regions in which distinct signals are transmitted.

The purpose of this arrangement of first and second low frequency transmitters 4, 4* and 5, 5* and of their transmission field is to allow, in addition to waking up the portable electronic units 36, detection of the direction of passage of individuals or objects through the entrance 6.

This detection of the direction of passage is detected by determining the order of reception of the first and second low frequency electromagnetic signals A, B transmitted respectively by the transmitters 4, 4* in the communication regions 61, 61 and by the transmitters 5, 5* in the communication regions 62, 63. The detection is accomplished by detection means including the antenna 28, the low frequency reception module 46 and the electronic/data processing unit 44.

One implementation of the passage detection system is described more specifically in European patent application No. 00204758.8 of 29.12.2000 entitled "Système de détection du passage d'un individu ou objet par une entrée-sortie à un espace délimité", also in the name of the present Applicant.

According to this application, the detection of the direction of passage through the entrance 6 is effected in particular by the electronic unit 36 on the basis of the order of reception of the first and second low frequency electromagnetic signals A, B transmitted at the entrance. The information concerning the direction of passage is for example determined by detecting at least which of the first and second low frequency electromagnetic signals A, B has been received in the first and in the last place during the passage of the individual or object through the entrance 6. This information of direction of passage, namely information of entrance, of exit or information according to which the electronic unit 36 remains located in the interior or in the exterior of the delimited space, is transmitted by the electronic unit 36 in the form of a high frequency electromagnetic signal to the high frequency transmitter-receivers 12, 13. Once the information of direction of passage has been transmitted, the portable electronic unit 36 is again put on standby. In this mode of operation the reception acknowledgement ACK transmitted by the transmitter-receivers 12, 13 may or may not be taken into account by the electronic unit 36. This reception acknowledgement ACK is preferably taken into account by the electronic unit in order to confirm the reception of the high frequency signal C.

For the sake of simplicity, this second mode of operation will be denoted in the following description by the acronym "WIWO" (Walk In Walk Out), signifying that the presence or absence of an electronic unit 36 in the delimited space is determined on the basis of the information on the direction of passage through the entrance 6.

In a typical application of the abovementioned detection system, such as automatic billing of journeys made by users of public transport means, it is desirable to equip the various vehicles of the public transport network with a detection system operating in as optimum a manner as possible, in order to detect the presence or absence of individuals in these various vehicles with high reliability.

Because of practical considerations related in particular to the possibilities of mounting low frequency transmitters located at the entrances to the delimited spaces defined by the compartments of vehicles, it is more or less easy to implement the second mode of operation called WIWO mentioned above, i.e. the mode of operation based on the detection of the direction of passage of the portable electronic units through the entrances. However, if the possibilities of mounting low frequency transmitters at the entrances are limited or hardly adequate to allow reliable detection of the direction of passage through these entrances, the detection system based on the first mode of operation called BIBO mentioned above is then preferably adopted.

It is noted that the second mode of operation WIWO mentioned above is generally preferred and adopted to the extent that is possible, since it only requires a communication of short duration between the electronic units and the transmitter-receivers associated with the delimited space for the purpose of establishing the presence or absence of a portable electronic unit within the delimited space. The first mode of operation BIBO mentioned above typically requires periodic exchanges between the electronic units and the transmitter-receivers associated with the delimited space in order to establish the presence or absence of an electronic unit within this space and it is thus slightly less optimal from the point of view of consumption with comparison to the second WIWO mode of operation.

Up until now, given that the portable electronic units are not themselves in a position to determine a priori if the system operates on the basis of the first or the second mode of operation mentioned above, the BIBO mode of operation or the WIWO mode of operation is adopted by default for the set of delimited spaces under consideration. A compromise is thus made, which is by definition non-optimal.

SUMMARY OF THE INVENTION

A general object of the present invention is thus to provide a solution allowing adoption of one of the other of the abovementioned modes of operation, possibly others, according to the type or characteristics of each delimited space in question, and in particular adoption of the mode of operation the best adapted to the delimited space in question, so as to enhance the reliability of detection of individuals or objects in these spaces and also optimise the consumption to the extent possible.

A particular object of the present invention is further to provide a solution having great flexibility of use, allowing—should this be appropriate—the application of several distinct modes of operation for a delimited space in question, in particular to remedy potential deficiencies of the one or the other modes of operation employed.

The present invention thus concerns a system for detecting individual or objects in a plurality of delimited spaces, each having at least one entrance.

Advantageous embodiments of the present invention form the subject matter of the dependent claims.

The present invention also concerns methods of detection.

According to the invention, the detection system is thus configured to function in at least two distinct modes of operation, such as the WIWO and BIBO modes of operation mentioned above (possibly others) and the low frequency signal or signals transmitted by the low frequency transmission means located at the entrance include to this end selection information indicating which of the modes of operation should be used by the portable electronic units during their passage through the entrance.

In this way it is possible for several distinct modes of operation to coexist and thus to adopt the mode of operation best fitted and most optimal for the delimited space in question. The reliability of detection of the individuals or objects is thus improved.

According to a preferred embodiment of the invention, the system if further configured to pass, at least temporarily, from one mode of operation to another for the same delimited space in question, for example to pass from the second mode of operation WIWO to the first mode of operation BIBO and conversely. It is possible in this way to remedy certain problems which may potentially intervene with the one or the other of the modes of operation utilised.

For example, one problem with the WIWO mode of operation based on detection of the direction of passage lies in that fact that there is a small probability that a portable electronic unit will not be able to detect correctly the direction of passage through the entrance. Thus, taking into account the physical characteristics of transmission and reception of electromagnetic signals in the environment, it is possible that the sequence of the signals received by the portable electronic unit will not be coherent or sufficiently determinate and will not allow a definite conclusion to be reached as to the direction of passage of this electronic unit through (or in the vicinity of) the entrance.

Although this probability of error is relatively small, it is desirable to make the system as robust as possible, in order to avoid this type or error to the maximum. A switch from the second mode of operation WIWO to the first mode of operation BIBO allows such an ambiguity to be resolved.

Likewise, a problem with the BIBO mode of operation based on the reception of the high frequency electromagnetic signal lies in that fact that there is a small probability that the electromagnetic signal of interrogation of presence will not be received correctly by the high frequency transmission-reception means associated with the delimited space or that the reception acknowledgement transmitted by the high frequency transmission-reception means associated with the delimited space will not be correctly received by the electronic unit, which could result in putting the portable electronic unit unintentionally into standby although it is actually still inside the delimited space.

Switching from the first mode of operation BIBO to the second mode of operation WIWO allows correction of such an error of interpretation.

BRIEF DESCRIPTION OF THE DRAWINGS

Other features and advantages of the present invention will appear more clearly from a reading of the detailed description which follows, with reference to the accompanying drawings, given by way of non-limiting example and in which.

DESCRIPTION OF PREFERRED EMBODIMENTS

Figure 3A:
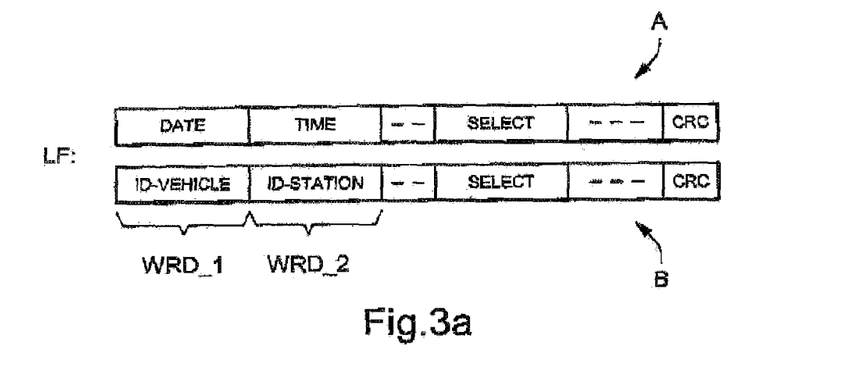
FIGS. 3a and 3b illustrate the format of low frequency and high frequency electromagnetic signals respectively exchanged between a portable electronic unit and the transmitters and receivers associated with the delimited space.

FIG. 3a shows the format and the content of the low frequency electromagnetic signals A, B transmitted to a portable electronic unit in the specific field of application to public transport means. It is again emphasised that the invention is not limited to this single application.

By way of purely illustrative, non-limiting example, the first and second low frequency electromagnetic signals A, B each comprise data relating to the delimited space with which the low frequency transmitters placed at the entrance are associated. Thus the first and second electromagnetic signals A, B each comprise a sequence of codes, broken down, in a non-limiting manner, into a plurality of code words WRD_i, i=1, 2, ..., preferably and typically terminated by a check word or CRC, as illustrated schematically in FIG. 3a.

The first electromagnetic signal A may thus comprise, as illustrated, first and second words indicating the date and time respectively of passage through the entrance to the delimited space where this signal is transmitted. In addition this first electromagnetic signal A may comprise, as may be appropriate, other words defining various parameters of transmission and/or reception of the high frequency electromagnetic signals which should be transmitted and/or received by the electronic unit, as will appear from the discussion of FIG. 3b.

In the non-limiting example of FIG. 3a, the second low frequency electromagnetic signal B comprises for its part one or more words indicating the identity of the delimited space in question (for example an identification of the vehicle, railway carriage or again the carriage of a subway train, etc.), as well as, in the field of the application considered, one or more words indicating the identity of the station or stop at which the public transport vehicle in question is standing.

According to the invention, at least one of the first and second low frequency electromagnetic signals A, B (preferably both) comprises selection information, denoted SELECT, which may comprise one or more bits of information, indicating which of the modes of operation should be used by the electronic units during their passage through the entrance to the delimited space in question.

Figure 5A:
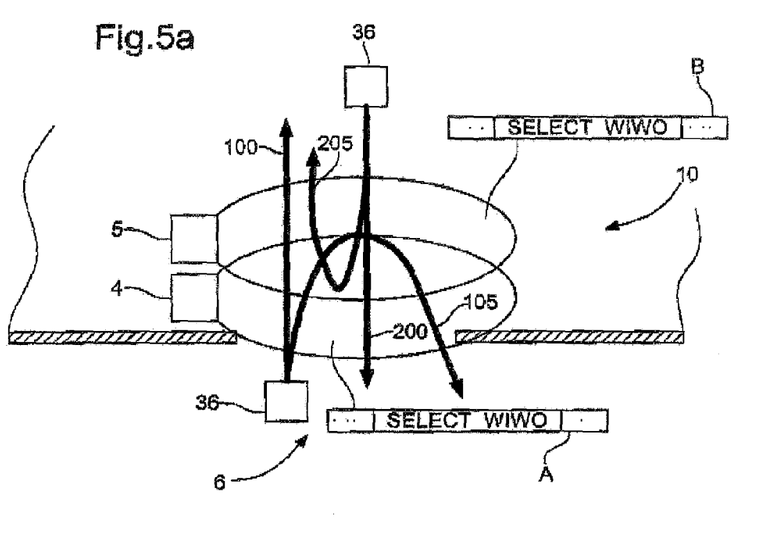
FIGS. 5a and 5b illustrate first and second advantageous embodiments of the detection system according to the present invention.

By way of example, FIG. 5a illustrates a first advantageous variant of the system according to the present invention, according to which the first and second low frequency electromagnetic signals A, B both comprise a specific item of selection information, denoted SELECT_WIWO, such that the presence or absence of an electronic unit 36 in the delimited space 10 should be detected according to the mode of operation WIWO.

Thus, according to this variant, if the electronic unit 36 enters or leaves the delimited space, as illustrated schematically by the arrows 100 and 200 respectively, or if this electronic unit 36 penetrates into the low frequency field but stays outside or inside the delimited space 10, as illustrated by the arrows 105 and 205 respectively, the portable electronic unit 36 receives unique selection information SELECT_WIWO, according to which it should operate according to the second mode of operation WIWO and thus transmits, following the passage through the entrance 6, a high frequency electromagnetic signal C, comprising information as to the direction of passage detected by the electronic unit 36. Following this transmission, the portable electronic unit is preferably placed in standby, as already mentioned.

Figure 5B:
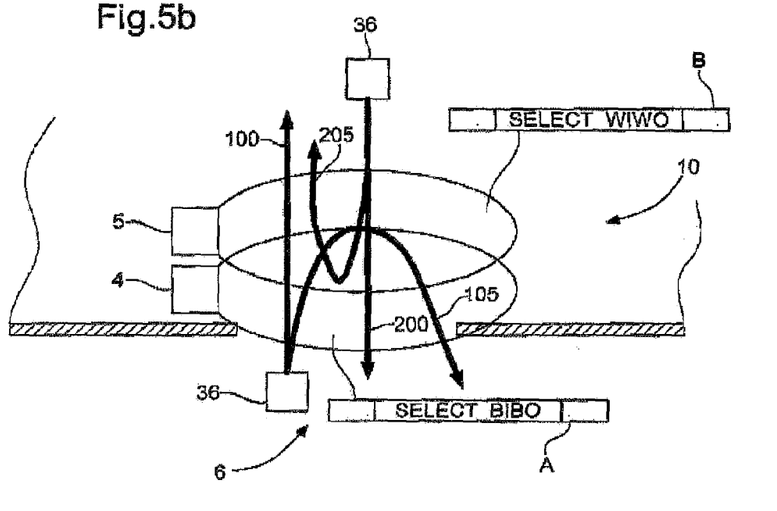

Again by way of example, FIG. 5b shows a second advantageous variant of the system according to the present invention, according to which the first low frequency electromagnetic signal A, transmitted towards the outside of the delimited space 10, comprises specific selection information, denoted SELECT_BIBO, such that the presence or absence of an electronic unit 36 in the delimited space 10 should be determined according to the first mode of operation BIBO following entrance into the delimited space. The second electromagnetic signal B transmitted towards the interior of the delimited space 10 for its part comprises specific selection information SELECT_WIWO, such that the portable electronic unit 36 operates, if it is standby mode, according to the second mode of operation WIWO.

According to this second variant, a portable electronic unit 36 normally operates according to the first mode of operation BIBO, that is to say it proceeds to transmit the high frequency electromagnetic signal C pending a reception acknowledgement ACK from the high frequency transmission-reception means (12, 13 in FIG. 1) associated with the delimited space 10. According to this variant, the portable electronic unit 36 only operates according to the second mode of operation WIWO if it has entered standby mode, although it is actually still inside the delimited space 10 and subsequently passes the fields of the low frequency transmitters located at the entrance 6.

It is recalled that, according to the mode of operation BIBO, a portable electronic unit is normally only put into standby mode if it is effectively outside the field of transmission and reception of the high frequency transmission-reception means associated with the delimited space and as a result no longer receives the reception acknowledgement ACK. Under normal conditions, when an active portable electronic unit leaves the delimited space 10 (in the direction of the arrow 200) or temporarily penetrates the low frequency fields but remains inside the delimited space 10 (in the direction of the arrow 205), the selection information transmitted by the second electromagnetic signal B is not taken into consideration.

It will thus be understood that the variant of implementation of FIG. 5b allows a possible correction to be made in the entry-exit register held by the control computer 20 and, if appropriate, of data stored by the portable electronic unit 36, in the case in which this electronic unit should have been put in standby in unintended manner.

Figure 3B:
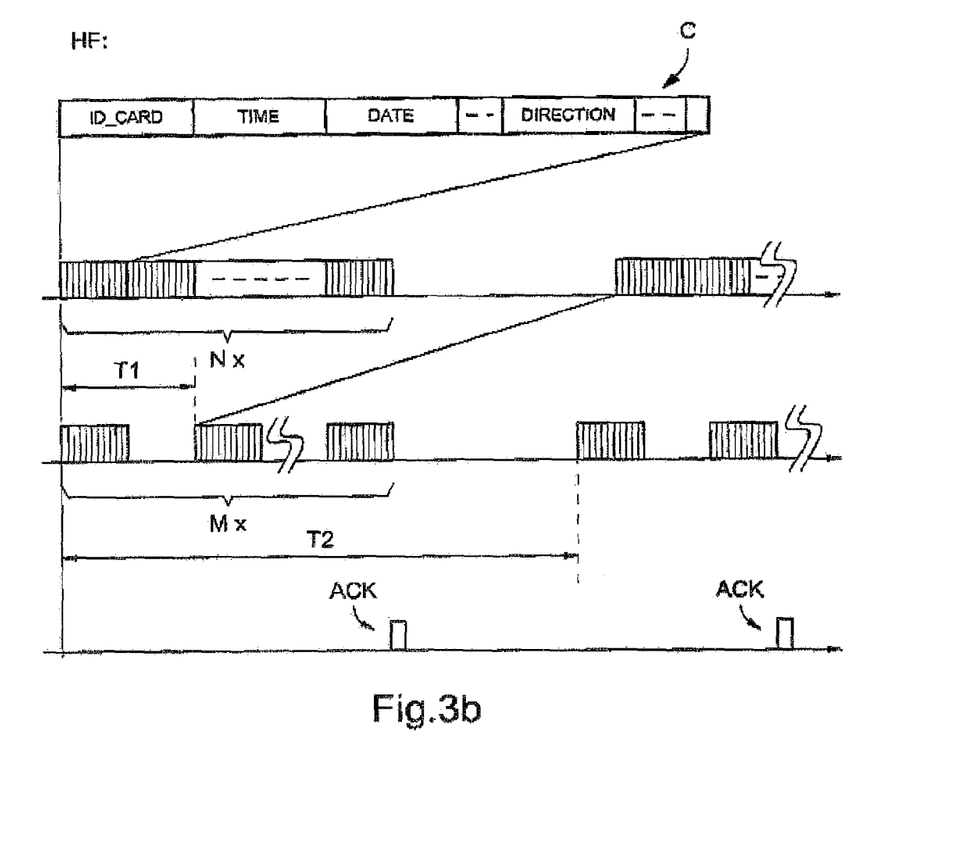

FIG. 3b shows the format and the contents of the high frequency electromagnetic signal C transmitted by a portable electronic unit, as well as the reception acknowledgement ACK transmitted by the high frequency transmission-reception means associated with the delimited space.

By way of example, the high frequency electromagnetic signal C transmitted by the portable electronic unit 36 comprises in particular an identification number ID of the electronic unit, information concerning the date and time of passage through the entrance as well as, if applicable, the information of detection of the direction of passage, denoted DIRECTION, if the system is operating according to the WIWO mode of operation.

As illustrated in FIG. 3b, a sequence formed of N repetitions of the abovementioned data is preferably transmitted several times (for example with a maximum of M repetitions) with a repetition period T1. The transmission of the high frequency C is preferably effected in this way in order to ensure some redundancy.

If the portable electronic unit 36 is operating in the BIBO mode of operation, the transmission of the sequences mentioned above is further repeated periodically with a repetition period T2.

The abovementioned repetition periods T1 and T2 as well as, if applicable, the repetition parameters N and M are preferably transmitted by means of the low frequency electromagnetic signals A and/or B. It is noted that these parameters are adapted in accordance with the characteristics of the delimited space in question and may, if appropriated, be adapted over the course of time, for example as a function of the duration between two successive stops of the transport vehicle.

As illustrated in FIG. 3b, the high frequency transmission-reception means associated with the delimited space proceed to transmit a reception acknowledgement ACK (both in the first and the second modes of operation BIBO and WIWO) once the high frequency electromagnetic signal C has been received correctly.

Figure 4:
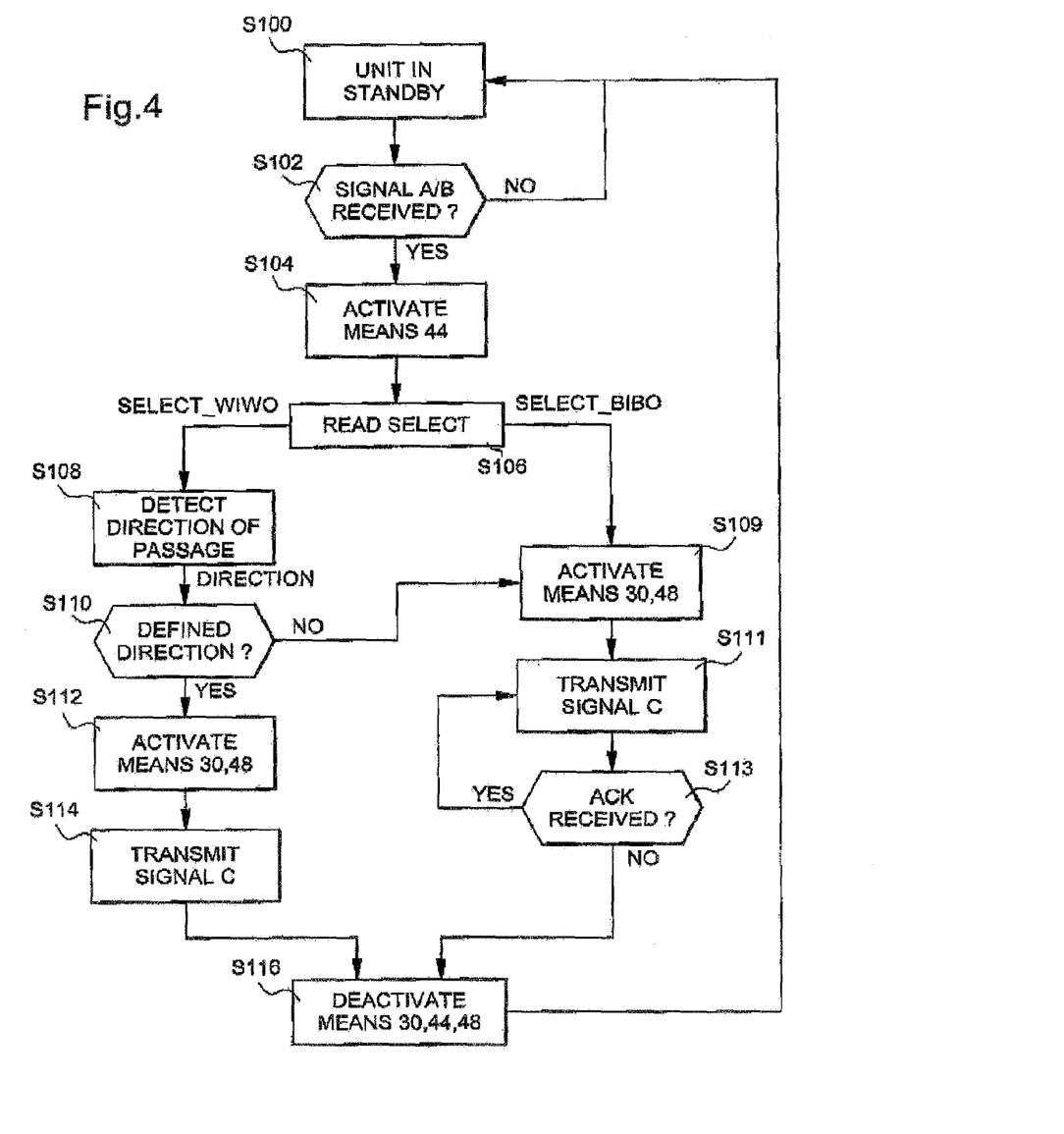
FIG. 4 is a flow chart illustrating the flow of the process of detection of the presence or of the absence of an electronic unit according to the present invention.

FIG. 4 shows a flow chart illustrating the flow of the process of detecting the presence or the absence of an electronic unit according to the present invention.

The detection process starts at step S100 with an electronic unit in standby mode. As soon as the portable electronic unit picks up one of the two low frequency electromagnetic signals A, B (step S102), the data processing means 44 of the electronic unit are activated (step 104) and these proceed to read and identify the selection information SELECT contained in the first electromagnetic signal received (step S106), namely the first A or the second low frequency electromagnetic signal B.

If this selection information SELECT corresponds to the specific selection information SELECT_WIWO, indicating that the electronic unit should operate according to the mode of operation WIWO, the electronic unit proceeds straightway to detection of the direction of passage DIRECTION (step S108), then to activation of the high frequency reception module 30, 48 (step S112) and then to transmission of the high frequency electromagnetic signal C containing the information of the direction of passage DIRECTION (step S114).

If the selection information SELECT corresponds to the specific selection information SELECT_BIBO, indicating that the electronic unit should operate according to the mode of operation BIBO, the electronic unit proceeds straightway to activate the high frequency reception module 30, 48 (step S109), then the transmission of the high frequency electromagnetic signal C (step S111) and to verification of the reception of the reception acknowledgement ACK (step S113), this latter step being repeated as long as this reception acknowledgement ACK is received.

Once the high frequency electromagnetic signal C comprising the information of direction of passage DIRECTION has been transmitted at step S114 (in the mode of operation WIWO) or no reception acknowledgement ACK has been received at step S113 (in the mode of operation BIBO), the data processing means 44 as well as the high frequency transmission-reception module 30, 48 of the electronic unit are deactivated (step S116) and this then passes into standby mode again and the detection process can start again at step S100.

In the mode of operation WIWO, the detection of the direction of passage is for example effected by the portable electronic unit on the basis of the order of reception of the first and second low frequency electromagnetic signals A, B transmitted at the entrance, for example by detecting at least which of the first and second low frequency electromagnetic signals A, B has been received in the first place and the last during the passage of the individual or object through the entrance 6. Solely by way of example, it is possible to form a truth table comprising at least the identifications of the first and last low frequency signals received. The table below shows by way of example a truth table formed by identifications of first, penultimate and last low frequency signals received as well as the interpretation of the direction of passage.

| | First signal received | Penultimate signal received | Last signal received | Conclusion |
|---|---|---|---|---|
| 1 | A | A | A | remained outside |
| 2 | A | A | B | entry |
| 3 | A | B | A | undefined state |
| 4 | A | B | B | entry |
| 5 | B | A | A | exit |
| 6 | B | A | B | undefined state |
| 7 | B | B | A | exit |
| 8 | B | B | B | remained inside |

In the above table, it is accepted that the states 3 and 6 do not allow a conclusion of entry or exit or that the portable electronic unit remained inside or outside the delimited space. It is accepted on the contrary that the states 2 and 7 correspond to an entry and an exit respectively of an electronic unit. It will obviously be understood that these states could also be considered as undefined states.

In the case in which the information of direction of passage is not conclusive and does not allow confirmation of whether the portable electronic unit is entering, leaving or remaining in the inside or outside of the delimited space (by way of example if the sequence of signals detected corresponds to the states 3 and 6 indicated in the table above), the switching of the system into the mode of operation BIBO advantageously allows this ambiguity to be resolved. This process is illustrated in FIG. 4 by step S110, where, if such an ambiguity in the direction of passage is detected, the process continues with the step S109 of activating the transmission-reception module 30, 40, followed by steps S111 and S113.

Referring again to the variant illustrated in FIG. 5b, it is noted that, if the electronic unit has passed in an unintended manner into the standby mode, although it is actually still inside the delimited space 10, this unit undertakes successively the steps of the detection process according to the operating mode WIWO, in this way allowing correction of the register of entries-exits.

In one or the other of the abovementioned cases in which the portable electronic unit is switched from one mode of operation to the other, it advisable to include in the high frequency electromagnetic signal C transmitted by the electronic unit information indicating that it has effected this switching, i.e. information analogous to the selection information SELECT transmitted by the low frequency electromagnetic signal or signals at the entrance.

It will be understood that various modifications and/or improvements evident to the man skilled in the art can be made to the various embodiments described in the present description, without departing from the scope of the invention defined by the accompanying claims.

Thus, in FIG. 1, the low frequency transmission means 4, 4*, 5, 5* are illustrated as being located in the compartment 32 of the vehicle. In general terms it is sufficient that these low frequency transmission means are associated with the delimited space in question, that is to say they transmit information relating to this delimited space. For example it is possible to conceive that the transmitters of the first low frequency electromagnetic signal A which are located outside the delimited space are not disposed within the compartment of the vehicle but are located in a fixed manner on the platform or stop where the passengers board and get off. Equally, the high frequency transmission-reception means can also be disposed outside the compartment of the vehicle, for example in the corridors giving access to the platforms or directly on these platforms.

The invention claimed is:

1. A system for detecting individuals or objects in a plurality of delimited spaces each having at least one entrance, the detection system comprising, for each of said delimited spaces:

low frequency transmission means associated with said each delimited space and located at said at least one entrance to transmit at least one low frequency electromagnetic signal in a communication region substantially covering said entrance; and high frequency transmission-reception means associated with the delimited space for receiving and transmitting at least one higher frequency electromagnetic signal;

the detection system further comprising:

cards or portable electronic units, each equipping an individual or object, each electronic unit comprising a low frequency reception module for receiving said at least one low frequency electromagnetic signal and a high frequency transmission-reception module for transmitting and receiving said at least one higher frequency electromagnetic signal; and at least one central processing unit associated with the said delimited spaces and connected to the said low frequency transmission means as well as to the said high frequency transmission-reception means for recording data relative to said at least one entrance and exit of the said portable electronic units, wherein the system is configured to operate according to at least two distinct modes of operation in which said electronic units communicate with said high-frequency transmission-reception means, and wherein said low frequency electromagnetic signal comprises selection information indicating to said electronic units, during their passage through an entrance of any one of said plurality of delimited spaces, which of the said at least two modes of operation should be utilised by said electronic units.

2. The system according to claim 1, wherein said low frequency transmission means comprise first and second low frequency transmitters for transmitting first and second low frequency electromagnetic signals respectively carrying data relating to the delimited space, these first and second low frequency electromagnetic signals being respectively transmitted in first and second communication regions, spatially separated from one another and at least partially overlapping, said first and second communication regions being situated respectively towards the outside and towards the inside of said delimited space, wherein each electronic unit comprises detection means for determining the direction of passage of said electronic unit through said entrance as a function of the reception of the said first and second low frequency electromagnetic signals, wherein the system is configured to operate according to a first mode of operation according to which each electronic unit proceeds to transmit, at least once, the said higher frequency electromagnetic signal, the presence or absence of an electronic unit in the delimited space being determined on the basis of reception, by the said high frequency transmission-reception means of the higher frequency electromagnetic signal emanating from the electronic unit, and wherein the system is configured to function according to a second mode of operation according to which each electronic unit proceeds to detect said direction of passage and transmits, by means of said higher frequency electromagnetic signal, information relative to said direction of passage, the presence or absence of an electronic unit in said delimited space being determined on the basis of said information of the direction of passage.

3. The system according to claim 2, wherein said first and/or second low frequency electromagnetic signal comprises selection information determined such that the presence or absence of an electronic unit in a selected delimited space is determined according to the said second mode of operation, and wherein the system is switched, at least temporarily, in the selected delimited space, into said first mode of operation if the information of direction of passage determined by the electronic unit is not conclusive.

4. The system according to claim 2, wherein said first low frequency electromagnetic signal comprises selection information determined such that, following an entry of an electronic unit into said selected delimited space, the presence or absence of the electronic unit in a selected delimited space is determined according to said first mode of operation, and wherein said second low frequency electromagnetic signal comprises selection information determined such that, when an electronic unit leaves the selected delimited space, the system is switched at least temporarily into said second mode of operation in case the system has previously concluded the absence of an electronic unit although the unit is still located in said selected delimited space.

5. The system according to claim 2, wherein the said first and/or second low frequency electromagnetic signals carry data comprising an indication allowing identification of said delimited space as well as an indication of the time and the date of the passage of the electronic unit through said entrance.

6. The system according to claim 2, wherein said delimited space is defined by a compartment of a transport vehicle, such as a bus, a railway carriage or a subway train, and in that said first and/or second low frequency electromagnetic signals carry data comprising an indication of the station or the stop where said transport vehicle is located.

7. A method of detecting an individual or an object in a detection system according to claim 2, wherein each electronic unit further comprises:

data processing means for processing data provided by the said low frequency reception module and/or data provided by or destined to the said high frequency transmission-reception module;

an electrical power supply source for supplying the said processing means as well as the said low frequency reception module and the said high frequency transmission-reception module, wherein the said low frequency reception module is supplied permanently or quasi-permanently, and wherein the said data processing means as well as the said high frequency transmission-reception module are deactivated in a standby mode of the said electronic unit, the said data processing means being activated by the said low frequency reception module when this detects one or the other of the said first and second low frequency electromagnetic signals, the said high frequency transmission-reception module being activated when the electronic unit has to transmit and/or receive the said higher frequency electromagnetic signal, this method comprising the following steps:
a) reception by a card or electronic unit carried by the said individual or object of the said first and/or second low frequency electromagnetic signal by means of the said low frequency reception module of the electronic unit;
b) activation of the said data processing means of the electronic unit;
c) reading the said selection information contained in the first received low frequency electromagnetic signal, namely the said first or second low frequency electromagnetic signal, and identification of the mode of operation associated with the delimited space;
d) if the said mode of operation corresponds to the second of the said modes of operation, detection by the said electronic unit of the said direction of passage through the entrance;
e) activation of the said high frequency transmission-reception module of the electronic unit; and
f) if the said mode of operation corresponds to the second of the said modes of operation, transmission, after the passage through the said entrance, of the said higher frequency electromagnetic signal comprising the said information of direction of passage by means of the said high frequency transmission-reception module,
otherwise transmission, at least once, of the said higher frequency electromagnetic signal by means of the said high frequency transmission-reception module awaiting a reception acknowledgement provided by the said high frequency transmission-reception means; and
g) if the said mode of operation corresponds to the second of the said modes of operation, return of the electronic unit into its standby mode and deactivation of the said data processing means and of the said high frequency transmission-reception module, and
if the said mode of operation corresponds to the first of the said modes of operation, return of the electronic unit to its standby mode and deactivation of the said data processing means and of the said high frequency transmission-reception module if no reception acknowledgement is received during a predetermined period of time, otherwise repetition of the transmission of the said higher frequency electromagnetic signal until no acknowledgement of reception is received during the said predetermined period of time.

8. The method of detection according to claim 7, wherein the said first and/or second low frequency electromagnetic signal comprises selection information determined such that the presence or absence of an electronic unit in a selected delimited space is determined according to the said second mode of operation,
wherein the system is switched, at least temporarily, in the selected delimited space, into the said first mode of operation if the information of direction of passage determined by the electronic unit is not conclusive,
and wherein, if the said information of direction of passage determined by the electronic unit in step d) is not conclusive and it is not possible to determine in an unequivocal manner whether the electronic unit is located inside or outside the said selected delimited space, the said electronic unit is then switched at least temporarily into the said first mode of operation.

9. The method of detection according to claim 7, wherein the said first low frequency electromagnetic signal comprises selection information determined such that, following an entry of an electronic unit into a selected delimited space, the presence or absence of this electronic unit in the said selected delimited space is determined according to the said first mode of operation,
wherein the said second low frequency electromagnetic signal comprises selection information determined such that, when an electronic unit leaves the selected delimited space, the system is switched at least temporarily into the said second mode of operation in case the system has previously concluded the absence of an electronic unit although the unit is still located in the said selected delimited space,
and wherein, if the said electronic unit is in standby mode and if the first low frequency electromagnetic signal received by the said low frequency reception module in step c) corresponds to the said second low frequency electromagnetic signal, the said electronic unit is then switched at least temporarily into the said second mode of operation.

* * * * *